(12) United States Patent
Bauer et al.

(10) Patent No.: US 8,369,780 B2
(45) Date of Patent: Feb. 5, 2013

(54) HYBRID TRANSMITTER FOR NON-CONTACT ENERGY AND DATA TRANSMISSION

(75) Inventors: Hans-Achim Bauer, Hamburg (DE); Andre Zybala, Hanstedt (DE)

(73) Assignee: Airbus Operations GmbH, Hamburg (DE)

( * ) Notice: Subject to any disclaimer, the term of this patent is extended or adjusted under 35 U.S.C. 154(b) by 229 days.

(21) Appl. No.: 12/772,797

(22) Filed: May 3, 2010

(65) Prior Publication Data
US 2010/0285747 A1 Nov. 11, 2010

Related U.S. Application Data

(60) Provisional application No. 61/175,717, filed on May 5, 2009.

(30) Foreign Application Priority Data

May 5, 2009 (DE) .......................... 10 2009 019 994

(51) Int. Cl.
*H04B 5/00* (2006.01)
(52) U.S. Cl. ..................... 455/41.1; 455/41.2; 307/10.1; 307/104
(58) Field of Classification Search .................. 455/41.1, 455/41.2; 307/10.1, 104
See application file for complete search history.

(56) References Cited

U.S. PATENT DOCUMENTS

| | | | |
|---|---|---|---|
| 4,833,337 A | 5/1989 | Kelley et al. | |
| 4,853,555 A | 8/1989 | Wheat | |
| 5,696,409 A | 12/1997 | Handman et al. | |
| 5,856,710 A | 1/1999 | Baughman et al. | |
| 5,890,779 A | 4/1999 | Blackburn et al. | |
| 5,959,433 A | 9/1999 | Rohde | |
| 6,008,547 A | 12/1999 | Dobler et al. | |
| 6,057,668 A | 5/2000 | Chao | |
| 6,222,443 B1 * | 4/2001 | Beeson et al. | 340/431 |
| 7,030,760 B1 | 4/2006 | Brown | |
| 7,263,388 B2 | 8/2007 | Yamamoto | |
| 7,432,622 B2 | 10/2008 | Griepentrog et al. | |
| 7,543,490 B2 | 6/2009 | Rey et al. | |
| 7,627,288 B2 | 12/2009 | Iida | |

(Continued)

FOREIGN PATENT DOCUMENTS

| DE | 4308144 C1 | 10/1994 |
|---|---|---|
| DE | 4344071 A1 | 7/1995 |

(Continued)

OTHER PUBLICATIONS

US Office Action dated Jun. 14, 2011 for U.S. Appl. No. 12/468,262.

(Continued)

*Primary Examiner* — Tuan H Nguyen
(74) *Attorney, Agent, or Firm* — Ingrassia Fisher & Lorenz P.C.

(57) ABSTRACT

A system is provided for non-contacting energy and data transmission from a first vehicle part to a second vehicle part. In this arrangement apart from a first inductive part in a hybrid transmitter for transmission of first data and energy an additional, second, data channel is installed in the first hybrid transmitter in such a manner that the second data channel is influenced as little as possible by the electromagnetic fields of the inductive part of the transmitter. To this effect a magnetic void can be created in the hybrid transmitters used. For the purpose of reception of not only the first data but also the energy and the second data a corresponding second hybrid transmitter is stated.

16 Claims, 5 Drawing Sheets

U.S. PATENT DOCUMENTS

| | | |
|---|---|---|
| 8,162,542 B2 | 4/2012 | Harman et al. |
| 2007/0176394 A1 | 8/2007 | Gehring et al. |

FOREIGN PATENT DOCUMENTS

| | | |
|---|---|---|
| DE | 19743313 C1 | 12/1998 |
| DE | 19753467 A1 | 8/1999 |
| DE | 10103280 B4 | 8/2002 |
| DE | 10307081 A1 | 9/2003 |
| DE | 10218124 A1 | 11/2003 |
| DE | 102004039372 A1 | 4/2005 |
| DE | 102006039808 A1 | 3/2008 |
| EP | 0260725 A2 | 3/1988 |
| GB | 2383879 A | 7/2003 |
| WO | 2007063500 A1 | 6/2007 |

OTHER PUBLICATIONS

United States Patent and Trademark Office, U.S. Notice of Allowance dated Dec. 23, 2011 for U.S. Appl. No. 12/468,262.

International Searching Authority, International Search Report dated Apr. 6, 2011 for International Application No. PCT/EP2010067561.

German Patent Office, German Office Action dated Sep. 13, 2011 for German Patent Application No. 10 2009 053 584.5.

* cited by examiner

HYBRID TRANSMITTER FOR NON-CONTACT ENERGY AND DATA TRANSMISSION

CROSS REFERENCE TO RELATED APPLICATIONS

This application claims the benefit of the filing date of U.S. Provisional Patent Application No. 61/175,717 filed on May 5, 2009 and of German Patent Application No. 10 2009 019 994.2 filed on May 5, 2009, the disclosures of which are hereby incorporated herein by reference.

TECHNICAL FIELD

The invention relates to non-contact, i.e., wireless, energy transmission in vehicles. In particular, the invention relates to a system comprising two hybrid transmitters for non-contact energy and data transmission between a first vehicle part and a second vehicle part, to a seat rail for an aircraft for non-contact energy and data transmission between the seat rail and a seat, to an aircraft seat for non-contact energy and data transmission between the aircraft seat and a seat rail, to an aircraft comprising such a system, as well as to a method for non-contact energy and data transmission.

BACKGROUND

In aircraft, the passenger space is increasingly equipped with additional technical devices that are designed to make travelling more pleasant and relaxing for passengers. Especially for long-haul operation, for example, aircraft seats are generally equipped with entertainment systems, in-flight entertainment systems (IFEs), voltage supply devices, in-seat power supply systems (ISPSSs) or electrical adjustment— and massage systems. Up to now these functions may have been connected to the aircraft seats by way of cable connections. However, such cabling may reduce the flexibility of the cabin in a retrofit phase. The implementation of changes in the equipment of the cabin, for example in a desired change of the seat pitch, may require cost-intensive new routing of the cabling.

Due to technical characteristics, the transmission of data by means of purely inductive technologies may be insufficient, for example, for entertainment systems incorporated in the seat of a passenger aircraft.

SUMMARY

Stated is a system comprising two hybrid transmitters for non-contact energy and data transmission between a first vehicle part and a second vehicle part, a seat rail, an aircraft seat, an aircraft and a method for non-contact energy and data transmission between a first vehicle part and a second vehicle part The described exemplary embodiments relate equally to the system comprising two hybrid transmitters, to the seat rail, the aircraft seat, the aircraft and the method. Furthermore, it should be pointed out that each method according to the invention can be implemented in the order as mentioned but also in any other order of the method-related steps.

According to an exemplary embodiment of the invention, a system is stated that comprises two hybrid transmitters for non-contact energy and data transmission between a first vehicle part and a second vehicle part. In this arrangement the system comprises a first hybrid transmitter as a transmitter unit and a second hybrid transmitter as a receiver unit. In this arrangement the transmitter unit comprises a first transmitter device and a second transmitter device, wherein the receiver unit comprises a first receiver device and a second receiver device. In this arrangement the first transmitter device is designed for non-contact transmission of energy and first data, and the second transmitter device is designed for non-contact transmission of second data. The first receiver device is designed for non-contact reception of the energy and the first data from the first transmitter device, and the second receiver device is designed for non-contact reception of the second data from the second transmitter device.

It should be pointed out explicitly that in this and in any other exemplary embodiment of the invention it may also be possible for the transmitter unit to be additionally designed as a receiver unit, and that the receiver unit can additionally be designed as a transmitter unit.

Furthermore, it should be pointed out that the designations "second data channel" and "additional data channel" comprise the unit that comprises the second transmitter device and the second receiver device.

For example, transmission of the energy and of the first data from the first transmitter device to the first receiver device can take place inductively. In this arrangement it may also be possible to use an optocoupler in the data channel. Furthermore, the second data channel can comprise a waveguide and/or a hollow waveguide. Transmission of the second data from the second transmitter unit to the second receiver unit can also take place inductively, however the use of optocouplers may also be possible. Likewise, any transmission of the second data may take place by means of electromagnetic waves of the desired frequency, amplitude and polarisation. To this effect the first transmitter device may be designed as a transmitter of electromagnetic waves, and the first receiver unit as a receiver of electromagnetic waves. The second transmitter device and the second receiver device thus provide an additional, second, data channel.

In other words, the system, which comprises two hybrid transmitters, expands the non-contacting (i.e., non-contact), for example inductive, energy and data transmission in such a manner that a higher data rate is achieved because of the provision of the further data channel when supplying the second vehicle part with data. For example, an aircraft seat can thus, by means of two independent and non-interacting energy and/or data channels, on the one hand be supplied inductively with energy and first data, and on the other hand, for example by means of electromagnetic waves, can be supplied with second data. In this arrangement, the first data channel, which comprises the first transmitter device and the first receiver device, can transmit inductively. To this effect a primary coil comprising a primary core and a secondary coil comprising a secondary core can be used. The second data channel, which is independent of the first data channel, which second data channel comprises the second transmitter device and the second receiver device, can transmit the second data, for example by means of an electromagnetic transmitter and an electromagnetic receiver. In this arrangement the second data channel can be arranged in a magnetically protected region in which it is protected against magnetic interaction with the magnetic fields of the primary coil and/or of the secondary coil.

In this case an inductively operating system comprising two transmitters is expanded by the second data channel, which can, for example, from the point of view of construction, be integrated in these two transmitters, which makes the system a system comprising hybrid transmitters. This is, for example, shown in detail in FIG. 1 below.

In other words, because of this exemplary embodiment of the invention a transmitter, which by means of the first transmitter device and the first receiver device can transmit energy and first data in a non-contacting manner, is expanded from the point of view of construction in such a way that a second data channel for additional transmission of second data from the first vehicle part to the second vehicle part is made possible. In this arrangement, from the point of view of construction, the second transmitter device can be integrated in the first transmitter device, and, from the point of view of construction, the second receiver device can be integrated in the first receiver device.

In this arrangement, by means of electromagnetic waves, the second transmitter device can provide an additional data rate for the system, which data rate may achieve several hundred megabits per second. Higher data rates may, however, also be achieved.

In this way the field of application of a system for non-contact energy and data transmission is considerably expanded and can, for example, advantageously be used as a system in a cabin of an aircraft, which cabin is to be refurbished.

Since the two hybrid transmitters are arranged in the system in a non-contact manner, they can both be affixed to different vehicle parts that can be repositioned independently of each other. There may be no need to change any cabling. Consequently, with this system the entire energy and data transmission can thus take place through the material located between the two hybrid transmitters. For example, the first hybrid transmitter can be arranged as a transmitter unit on a seat rail in an aircraft, and the second hybrid transmitter can be arranged as a receiver unit in an aircraft seat. In this arrangement in this interior architecture of the aircraft for example the floor of the aircraft is arranged between the seat and the seat rail.

In other words the additional data channel can comprise a transmitter and a receiver, which by means of radio connections exchange data unidirectionally, or if desired bidirectionally. In this arrangement, in the additional data channel for example radio transmission standards such as WLAN, Bluetooth or UWB can be used. However, other radio connections are also possible. Corresponding design measures and devices are present in the device.

In this arrangement in the second transmitter device and in the second receiver device, apart from electromagnetic transmitters and electromagnetic antennae, optocouplers can also be used. Furthermore, the use of RFID transmitters is possible, for example for mutual recognition of the receiver unit and the transmitter unit.

According to a further exemplary embodiment of the present invention, the first transmitter device further comprises a first control unit with a voltage input, a data input and a signal output. Furthermore, the first receiver device comprises a second control unit with a signal input, a data output and a voltage output. In this arrangement the first control unit is equipped, from an electrical voltage that is present at the voltage input, to generate an alternating voltage at the signal output. In this arrangement the first control unit modulates the alternating voltage on the basis of the first data received at the data input. The second control unit is furthermore designed, from the modulated alternating voltage that is present at the signal input, to demodulate the first data and to provide it at the data output, and to provide a voltage at the voltage output, which voltage has been prepared for use in an electrical consumer.

In this arrangement this transmission system comprising the first transmitter device and the first receiver device may also be designated a power transmission system that by means of modulation can also transmit data.

In this arrangement the first control unit can, for example, be integrated from the point of view of construction in the first transmitter device; however, a separate and spaced-apart design of the control device is also possible. This applies to the same extent to the second control unit and the first receiver device.

In other words, in the first control unit an alternating voltage is generated, onto which the data to be transmitted is modulated in the form of a frequency change. The frequency-modulated alternating current formed in this manner can be conveyed to a primary coil, which together with a secondary coil for the purpose of transmission forms a magnetic circuit. The primary coil in turn conveys the frequency-modulated alternating current induced from the magnetic circuit onward to a second control unit that can demodulate the data transmitted from the frequency modulation. Furthermore, the induced alternating current present in the second control unit can be prepared in such a manner that it is, for example, present at a constant predetermined frequency or as a direct voltage so that it can be further used for operating electrical consumers. Accordingly, by way of a single combination comprising a primary coil and a secondary coil a simultaneous and complete transmission of electrical energy and of first data can be achieved without the need for using a plurality of electromagnetic transmitters, so that the proposed design has a positive effect on the weight and on costs. Systems for modulating and demodulating data or any signals are well known from the state of the art so that adequately robust and economical control units for modulation and demodulation are realistic.

It should be pointed out that amplitude modulation, phase modulation or any desired combination of frequency modulation, phase modulation and amplitude modulation is possible. This can advantageously be utilised in relation to the energy or data to be transmitted.

In other words, the system according to this exemplary embodiment of the invention is in a position to provide a system for non-contacting transmission of electrical energy and first data, which system is of a simple design, only provides one magnetic circuit for transmitting the electrical energy and the first data, and moreover is of robust and lightweight construction. In addition to these advantages, data transmission, for example in the megabit range per second, can be provided in that a second data channel is provided by means of the second transmitter device and the second receiver device. This system comprising two hybrid transmitters can also be used for performance-intensive systems such as in-flight entertainment systems, voltage supplies in the aircraft seat and for adjustment and massage systems that are integrated in the aircraft seat. In this arrangement from the point of view of construction the second data channel can thus be integrated in the inductive transmission system at a magnetically slightly permeated, protected, location. This not only saves space, but mechanical protection for the second data channel can be provided by the first transmitter device and the first receiver device.

According to a further exemplary embodiment of the invention, the first transmitter device comprises a primary coil and a primary core, and the first receiver device comprises a secondary coil and a secondary core. In this arrangement the first transmitter device transmits the energy and the first data inductively by means of the primary coil and the primary core to the secondary coil and to the secondary core of the first receiver device.

It should further be mentioned that this exemplary embodiment can comprise a primary coil, which primary coil can be connected to the signal output of the first control unit. Likewise, a secondary coil can be connected to the signal input of the second control unit.

In this arrangement it is also possible for several primary coils to be taken together to form a segment, and to be controlled by a first shared control unit. This is, for example, described in detail in FIG. 3.

In other words, the system according to this exemplary embodiment of the invention comprises a non-contacting inductive energy and data transmission system which by means of the primary coil and the primary core and a secondary coil and the secondary core can transmit energy and data from the first vehicle part to the second vehicle part. In the primary coil the electrical energy is converted to an electrical field, and in the secondary coil it is converted back to electrical energy. As a result of modulation of the generated magnetic field in the manner described above, with this coil system it is also possible to transmit data. However, since such transmission can be limited from the point of view of the data transmission rate, the present invention provides the additional, second, data channel. If desired, said data channel can achieve a data rate of several hundred megabits per second and can be placed at a magnetically slightly permeated, protected, location.

Likewise it may be possible for the primary coils, which are arranged adjacent to the secondary coils, to be deactivated by means of a control unit.

According to a further exemplary embodiment of the invention, from the point of view of construction the second transmitter device is integrated in the primary core of the first transmitter device.

In this arrangement it may be possible for the second transmitter device to be placed at a position in the primary core, at which position a magnetic field minimum of the magnetic or electromagnetic field of the first transmitter device and/or of the first receiver device has been placed. Likewise, from the point of view of construction, the electromagnetic receiver, the second receiver device, can be integrated in the secondary core in such a manner that it is placed at a magnetic field minimum of the magnetic field or electromagnetic field of the first transmitter device and/or of the first receiver device.

The second transmitter device and the second receiver device can, for example, be bonded into the recesses. Furthermore, it is possible for the second transmitter device to be cast with the housing of the transmitter unit, and for the second receiver device to be cast with the housing of the receiver unit.

In other words, the primary coil, the primary core, the secondary coil and the secondary core provide an inductive transmission system. In this arrangement the primary core and the secondary core each comprise a recess that is designed in such a manner that, along the recesses that have been made to coincide, in the closed-circuit state of the coils a minimum of the magnetic field or of the electromagnetic field exists. An exemplary embodiment is shown in FIG. 1 and FIG. 2. In this way it can be ensured that influencing the alternating electromagnetic field of the inductive transmission system has the smallest-possible influence on the second transmitter device and second receiver device placed in the two recesses, and on their additional data transmission.

According to a further exemplary embodiment of the invention, from the point of view of construction the second transmitter device is integrated in the secondary core of the first transmitter device.

In this arrangement, from the point of view of construction, integration of the second receiver device can take place by means of a recess in the secondary core, which integration is implemented in such a manner that in that location a magnetic void, in other words a magnetic minimum, of the secondary core results. In this arrangement, operation is described by the state of the secondary coil and/or the primary coil in which state current flows through them. In this arrangement in this and in any other exemplary embodiment the electromagnetic void is characterised in that the space is free of any magnetic field lines of the transmission system, or in that only few magnetic field lines are present at that location. In this way it can be ensured that data transmission in the additional data channel that is provided by the second transmitter device and by the second receiver device is not influenced much or not influenced at all. This describes the case in which in the second data channel data is also transmitted by means of induction. In the case in which the second data channel transmits data by means of optical and non-inductive transmission elements, they are not influenced by magnetic flux densities.

According to a further exemplary embodiment of the invention, at least one unit of the second transmitter unit and of the second receiver unit is arranged in a region in which in a state in which current flows through the primary coil there is a minimum magnetic field.

The transmission system for inductive power transmission and the system for additional data transmission, for example by means of electromagnetic waves, are designed in such a manner that mutual influencing is impossible. This is ensured by the placement of the second transmitter device and the second receiver device at positions within the primary core or within the secondary core at which positions there are electromagnetic minima.

According to a further exemplary embodiment of the invention, at least part of the first transmitter device is encapsulated in a primary housing, and at least part of the first receiver unit is encapsulated in a secondary housing.

In this arrangement the primary housing can enclose the primary coil, and/or the secondary housing can enclose the secondary coil. It is also possible for the primary coil and the primary core to be encapsulated by the primary housing, and/or for the secondary coil and the secondary core to be encapsulated by the secondary housing.

This provides a particularly robust embodiment of the non-contacting inductive energy and data transmission, which may particularly be used in the field of seats and seat rails in aircraft, because in those applications considerable mechanical friction losses on the sliding components can occur.

According to a further exemplary embodiment of the invention, the primary housing and the secondary housing each comprise an aperture, wherein the second transmitter device is arranged in the aperture of the primary housing, and wherein the second receiver device is arranged in the aperture of the secondary housing.

In this arrangement these apertures of the housings can be made to overlap the already described recesses in the primary core and in the secondary core in the installed position. This provides a very compact design of the hybrid transmitters and saves space, an aspect which is very valuable in particular in an aircraft.

According to a further exemplary embodiment of the invention, the system comprises magnetic isolation. In this arrangement magnetic isolation is placed in the system in such a way that as a result of the magnetic isolation the second transmitter device and the second receiver device are protected from a magnetic field of the first transmitter device and of the first receiver device.

In this arrangement it may be possible for the second transmitter device and/or the second, receiver device, for example, within a non-magnetisable tube of any desired shape, to be inserted into one of the cores. However, magnetic isolation comprising other forms and materials for magnetic isolation of the second data channel is also possible.

According to a further exemplary embodiment of the invention, the system comprises the first vehicle part and the second vehicle part. In this arrangement the first vehicle part comprises the transmitter unit and the second vehicle part comprises the receiver unit.

In other words, in their installed positions the two hybrid transmitters are arranged without establishing mutual contact.

For example, it may be possible to equip a seat in an aircraft with a receiver unit, and a seat rail in an aircraft with one or several transmitter units in the form described above. This ensures that non-contacting inductive energy and data transmission between the seat and the seat rail takes place, wherein the transmitted data rate, as a result of the additional data channel that is integrated in the magnetically protected space of the inductive transmission system, is in the range of megabits per second. In this way it can be ensured that during retrofit phases of the cabin no new cabling is required, and that with this system electrical energy and data can also be supplied to all the consumers with higher bit rates, such as entertainment systems in the aircraft seat.

According to a further exemplary embodiment of the invention, the first vehicle part is arranged on the floor side, and a floor of the vehicle is arranged between the transmitter unit and the receiver unit.

In other words it is possible, by means of these two hybrid transmitters, to transmit energy and data through the floor, for example of an aircraft, for example to an aircraft seat.

According to a further exemplary embodiment of the invention, the second vehicle part is selected from the group comprising a seat, a passenger service unit, an in-flight entertainment system, a cargo container, a galley, and an on-board toilet.

In other words, the second aircraft part is a unit to which energy and data are to be supplied.

In this way it may be possible to provide the complete energy and data supply of the entire vehicle regions within the floor, and in a non-contacting manner to supply the required energy and the data to vehicle parts situated above the floor, for example to cargo containers, galleys, on-board toilets, entertainment systems or any other electrical consumers. For example, by means of RFID technology the transmitter units provided underneath the floor can detect which electrical consumer was placed by the retrofitting personnel above the floor in a desired form. The transmitter units can form a network of transmitters underneath the floor. However, it is possible for identification of a consumer to take place by way of an unequivocal ID that is transmitted to the control unit by way of the available data paths.

According to a further exemplary embodiment of the invention, the first vehicle part is arranged so as to be affixed to the vehicle, and the second vehicle part can be positioned in different positions relative to the first vehicle part.

In this arrangement the unit (second vehicle part), e.g. the aircraft seat to which energy and data are to be supplied, can be positioned relative to the first vehicle part in such a manner that at least one secondary coil arranged in the unit is arranged so as to be adjacent to at least one primary coil in order to form a magnetic circuit. In this way transmission of the energy and of first data and second data is made possible.

Especially in the context of vehicle parts that within a retrofit phase, for example, need to be displaced within an aircraft and which vehicle parts require electrical access and data access, the present invention provides a solution for non-contacting energy and data transmission which meets the demanding requirements relating to the data rate.

According to a further exemplary embodiment of the invention, a seat rail for an aircraft for non-contacting energy and data transmission between the seat rail and a seat is stated. In this arrangement the seat rail comprises a hybrid transmitter as a transmitter unit, wherein the transmitter unit comprises a first transmitter device and a second transmitter device. In this arrangement the first transmitter device is designed for non-contacting transmission of energy and first data, and the second transmitter device is designed for non-contacting transmission of second data.

According to a further exemplary embodiment of the invention, a seat for an aircraft for non-contacting energy and data transmission between the seat and a seat rail is stated. In this arrangement the seat comprises a hybrid transmitter as a receiver unit, wherein the receiver unit comprises a first receiver device and a second receiver device. In this arrangement the first receiver device is designed for non-contacting reception of the energy and of the first data from the first transmitter device, and the second receiver device is designed for non-contacting reception of the data from the second transmitter device.

According to a further exemplary embodiment of the invention, an aircraft with a system according to any one of the exemplary embodiments stated above is stated.

According to a further exemplary embodiment of the invention, a method for non-contacting energy and data transmission between a first vehicle part and a second vehicle part is stated. In this arrangement the method comprises the following steps: non-contacting simultaneous transmission of energy and first data from the first vehicle part to the second vehicle part by means of a first transmitter device of a transmitter unit, and parallel non-contacting transmission of second data from the first vehicle part to the second vehicle part by means of a second transmitter device of the transmitter unit.

The provision of a system comprising at least two hybrid transmitters for non-contact inductive energy and data transmission with an additional, magnetically-protected, integrated second data channel for non-contact and material-penetrating energy and data transmission between two vehicle parts may be considered a core aspect of the invention.

Further exemplary embodiments and advantages of the invention are stated in the following description of the figures. However, the invention is not limited to these exemplary embodiments.

BRIEF DESCRIPTION OF THE DRAWINGS

The detailed description will hereinafter be presented in conjunction with the following drawing figures, wherein like numerals denote like elements and the illustrations are diagrammatic and not necessarily to scale, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1A:
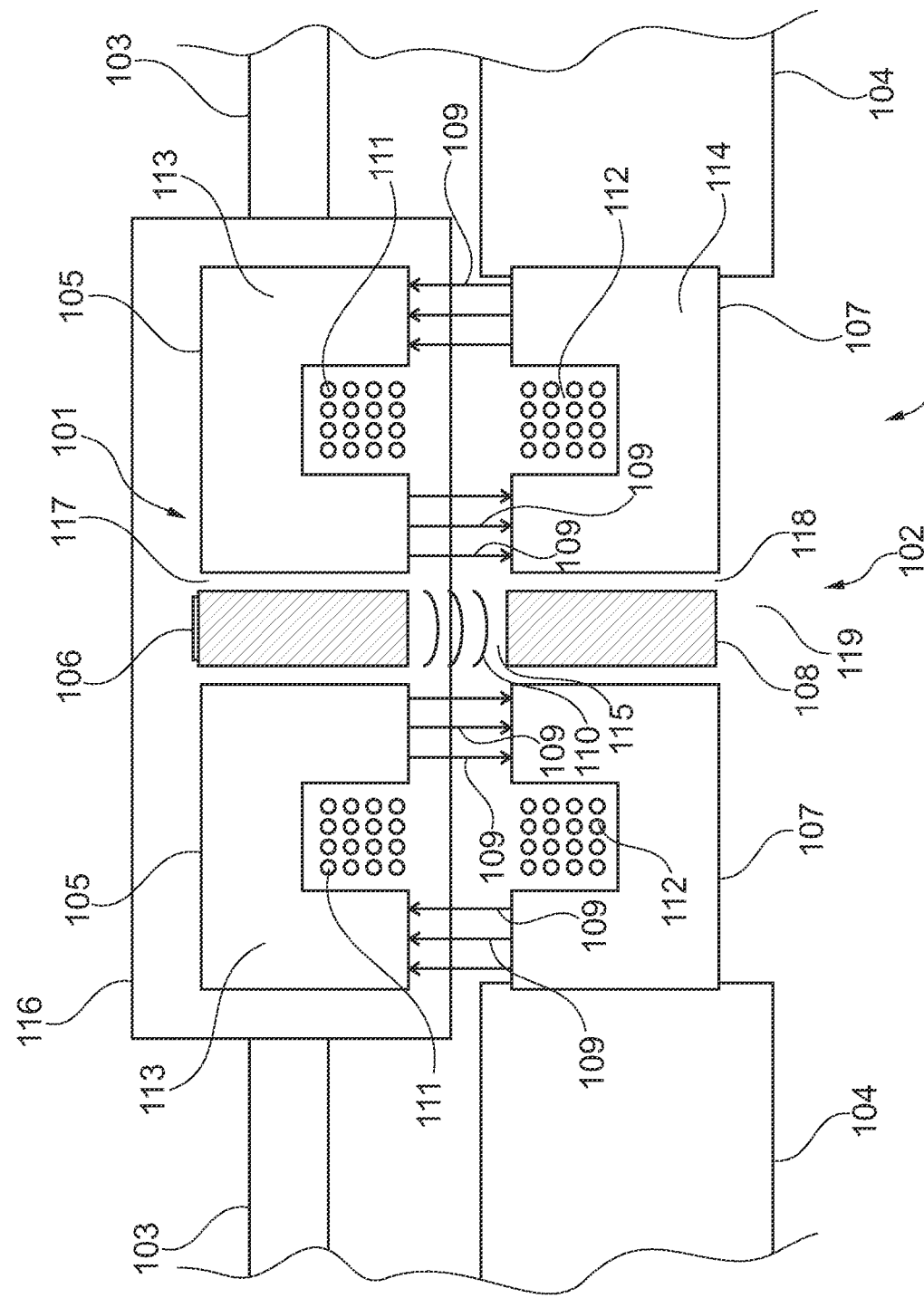
FIG. 1a and FIG. 1b show a diagrammatic two-dimensional section view of a system comprising two hybrid transmitters according to an exemplary embodiment of the invention.

FIG. 1a shows a system 100 comprising two hybrid transmitters 101, 102 for non-contacting energy and data transmission between a first vehicle part 103 and a second vehicle part 104. In this arrangement the first hybrid transmitter is designed as a transmitter unit 101 and the second hybrid transmitter is designed as a receiver unit 102. The transmitter unit in turn comprises a first transmitter device 105 and a second transmitter device 106. The receiver unit 102 comprises a first receiver device 107 and a second receiver device 108.

In this arrangement the transmitter device is designed for non-contacting transmission of energy and first data. In this arrangement the shown magnetic field lines 109 indicate the magnetic field, which by means of modulation apart from energy also transmits the first data from the first transmitter device to the first receiver device. This inductive process has already been described in detail several times above. The second receiver device is designed for non-contacting reception of the second data from the second transmitter device. Furthermore, the second transmitter device is designed for non-contacting transmission of second data. The second data is indicated by the waves 110 that are generated for example by a radio connection that provides the additional data channel 119.

FIG. 1a further shows a primary core 113, around which a primary coil 111 is wound.

In other words, the first transmitter device provides an inductive transmission system for energy and data. The first receiver unit in turn comprises a secondary core 114 and a secondary coil 112 in order to convert the modulation of the magnetic field to current, thus being able to provide a voltage, and, if applicable, data, to an end user.

The diagram further shows that the second transmitter device 106, which can, for example, be designed as an electromagnetic transmitter, is arranged in a recess 117 in the primary core 113 in which there is a minimum magnetic field that is present in the closed-circuit state of the primary coil. In this way the least possible influence on data transmission from the electromagnetic transmitter to the second receiver device 108 can be achieved. The second data, indicated by the waves 110, can thus be transmitted independently and without interference even when there is power transmission and data transmission in the inductive system. In this arrangement the inductive part of the system is arranged on the right-hand side and on the left-hand side of the second data channel 119. Likewise, the second receiver device 108 is arranged in a recess 118 of the secondary core 114.

Due to the shape of the recesses 117 and 118 a situation arises in which the magnetic field predominantly extends from the shown front surfaces of the primary core to the opposite front surfaces of the secondary core. In this arrangement the left-hand side and the right-hand side part of the primary core could form a single shared component. The same applies to the right-hand part and to the left-hand part of the secondary core. In the additional integrated data channel 119 of the second data, in other words along the direction of propagation of the electromagnetic waves from the second transmitter device 106 to the second receiver device 108, there is a region which comprises a minimum of magnetic field lines in the state in which current flows through the primary coil and/or the secondary coil.

In this arrangement the primary core and the secondary core each comprise a recess 117 and 118 that is designed in such a manner that along the recesses that have been made to coincide, in the state in which current flows through the coils, there is a minimum of the magnetic field or of the electromagnetic field. In this way it can be ensured that the alternating electromagnetic field of the inductive transmission system has the least possible influence on the second data channel 119.

FIG. 1a further shows that between the transmitter unit 101 and the receiver unit 102 there is only the housing 116. However, partial enclosure of elements from the first transmitter device, for example enclosure of the primary coil by the housing, is also possible. In this arrangement the housing is merely a conversion in order to provide the transmitter unit or the receiver unit as an overall mechanical unit that externally comprises one piece.

In other words, this exemplary embodiment of the invention comprises a non-contacting inductive energy and data transmission system which by means of the primary coil and the primary core as well as a secondary coil and the secondary core can transmit energy and data from the first vehicle part to the second vehicle part. However, since such transmission can be limited in relation to the inductive data transmission rate, the present invention provides the additional second data channel 119. If desired, this second data channel 119 can achieve a data rate of several hundred megabits per second; it is located in a position within the two coils, which position is magnetically only slightly permeated and is protected.

Figure 1B:
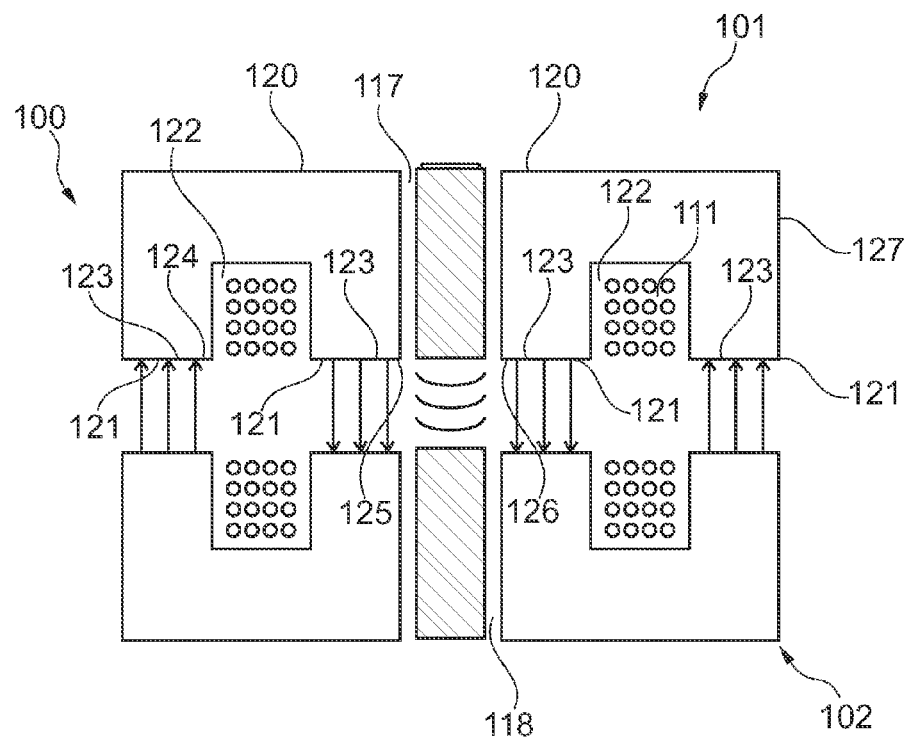

FIG. 1b shows that the first transmitter device from the point of view of its shape and dimensions is of a design that is identical to that of the first receiver device. The primary core 113 comprises a planar, flat, distal end 120 and a proximal end 121 that comprises a circumferential indentation 122 in which the circumferential primary coil 111 is located. Centered on this there is the recess 117 for the second transmitter device of the additional data channel. In this arrangement the front surfaces 123 of the webs 124-127, which are formed from these front surfaces 123, face the corresponding webs on the side of the second hybrid transmitter as a receiver unit 102. In this way a homogeneous extension of the magnetic field from a front surface 124-127 of the primary core to the secondary core is achieved. Likewise, the two recesses 117 and 118 are aligned with each other in the installed position.

Figure 2:
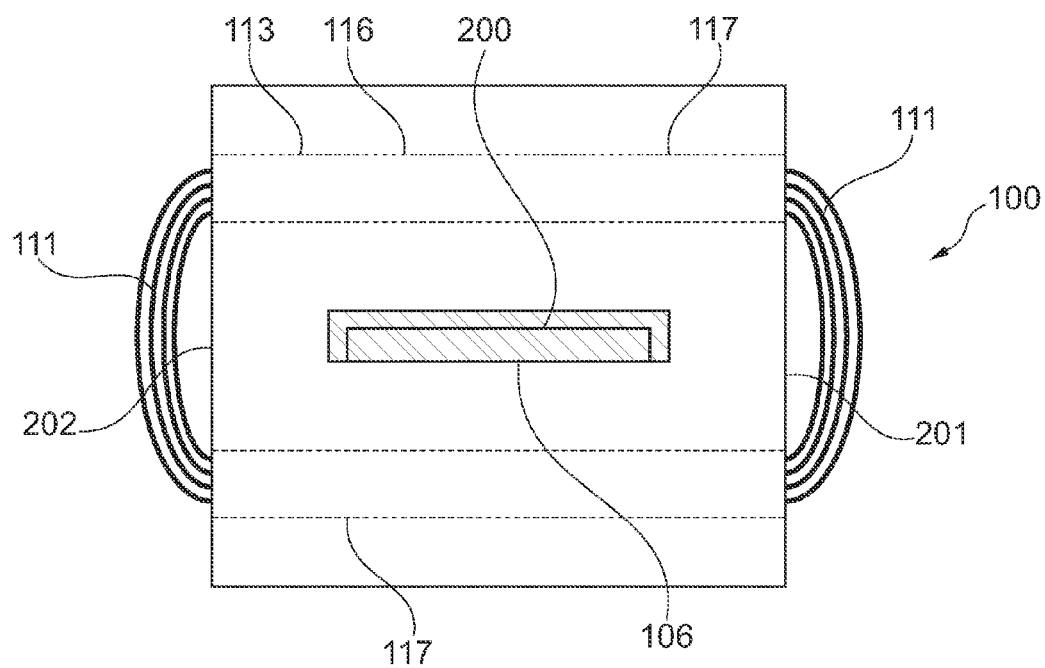
FIG. 2 shows a diagrammatic two-dimensional top view of a system comprising two hybrid transmitters according to an exemplary embodiment of the invention.

FIG. 2 shows a top view of a system from FIG. 1, with the diagram showing the aperture 200 in the housing 116. In this aperture the first transmitter device 105 can be received. In this arrangement the aperture is placed in such a manner that the second transmitter device 106 is placed in a magnetic field minimum. In this way a situation can be prevented in which the two independent data transmissions provided by the system 100 are influenced. In this exemplary embodiment the recesses 117 are not circumferential but instead they extend into the primary core from a first lateral end 201 of the primary core to a second lateral end 202. The same can apply analogously to the secondary core.

Figure 3:
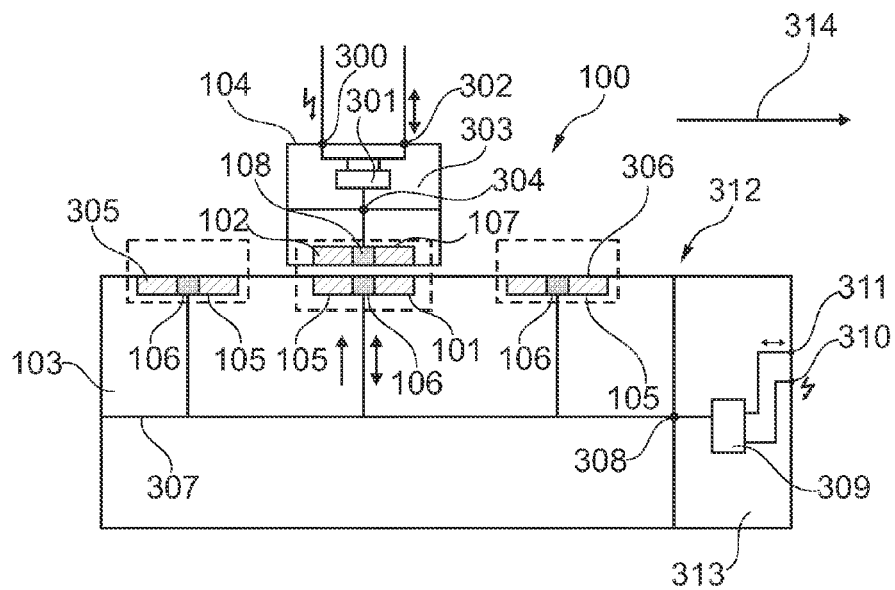
FIG. 3 shows a diagrammatic two-dimensional view of a system comprising several hybrid transmitters according to an exemplary embodiment of the invention.

FIG. 3 shows a first vehicle part 103, which as an example shows two further transmitter units 305 and 306. They are arranged below a surface 312, which can, for example, be a floor within the vehicle. Furthermore, the second vehicle part 104 is shown with the receiver unit 102, wherein the second vehicle part can be positioned along the direction 314 above the various transmitter units. This can meet various requirements, for example in a retrofit phase of a cabin. In order to establish a connection for the transmission of electrical energy and data it is necessary for a magnetic circuit to form between a transmitter unit and the receiver unit 102, for example with the transmitter unit 101, which is shown in the diagram by a dashed line.

The transmitter units 101, 305 and 306 and the receiver unit 102 each comprise a core that comprises windings of a coil. The primary coil of the transmitter units 101 is connected to the line 307, which in turn is connected to a signal output 308 of a first control unit 313. It should be noted that there is no requirement for spatial proximity between the first control unit 313 and the vehicle part 103. The first control unit could also be operated clearly away from the vehicle part 103. The first control unit 313 (also designated "rail control") further comprises a data input 311 and a voltage input 310. The data input 311 can, for example, be connected to an already existing data line or a databus in the vehicle concerned, while the voltage input 310 can be connected to the on-board voltage supply. The secondary coil of the receiver unit 102 is connected to a signal input 304 of a second control unit 303 that comprises a voltage output 300 and a data output 302. At the voltage output 300 a correspondingly prepared supply voltage can be tapped, which can be used to operate devices within the second vehicle part 104.

The data from the data output 302 can be used for a multitude of different applications in which applications there is a need for data or device states to communicate with vehicle-central devices. In order to provide a suitable output signal at the signal output 308, the first control unit 313 comprises a modulator 309 that modulates the frequency of the electrical voltage at the voltage input 310 depending on the incoming data at the data input 311. For this purpose the first control unit 313 or the modulator 309 preferably at first comprise a rectifier (not shown) which from the incoming voltage at the voltage input 310 produces a direct voltage. By means of a so-called "chopper" it is possible to generate from the rectified voltage an alternating voltage with a carrier frequency. Finally, the modulator 309 modulates the frequency of the alternating voltage around the carrier frequency and makes said voltage available at the signal output 308.

In order to select a corresponding carrier frequency that is suitable for the transmission of high data flows it should be taken into account that with an increase in the carrier frequency a reduced quantity of ferrites is used to produce a suitable coil core for the windings, but it should also be taken into account that an increase in the carrier frequency is associated with an increase in magnetic losses. For example, a carrier frequency of approximately 100 kHz could be used, by means of which data transmission rates of around 115 kbit/s or higher could be achieved. However, it is explicitly stated that these values are not to be interpreted as limiting the scope of the invention; instead, they are intended to describe the system according to the invention more concretely with reference to exemplary parameters that might be used. Depending on the requirements of data-consuming devices or the like, other frequencies and other bit rates may be sensible and preferable.

In the second control unit 303, analogously to the first control unit 313, there is a demodulator 301 which from the regular frequency deviations of the signal at the signal input 304 demodulates the corresponding data and provides it at the data output 302. After demodulation the alternating voltage that is present at the modulated frequency can be converted to commonly-used values, so that, for example, an alternating voltage with a frequency of 400 Hz in the vicinity of the aircraft could be output at 50 Hz or as a direct voltage. In this way electrical consumers can be operated at the voltage output 300.

In order to reduce the number of necessary first control units 313 it is imaginable to combine several primary windings to form a segment, which primary windings are controlled by a shared first control unit 313.

Figure 4:
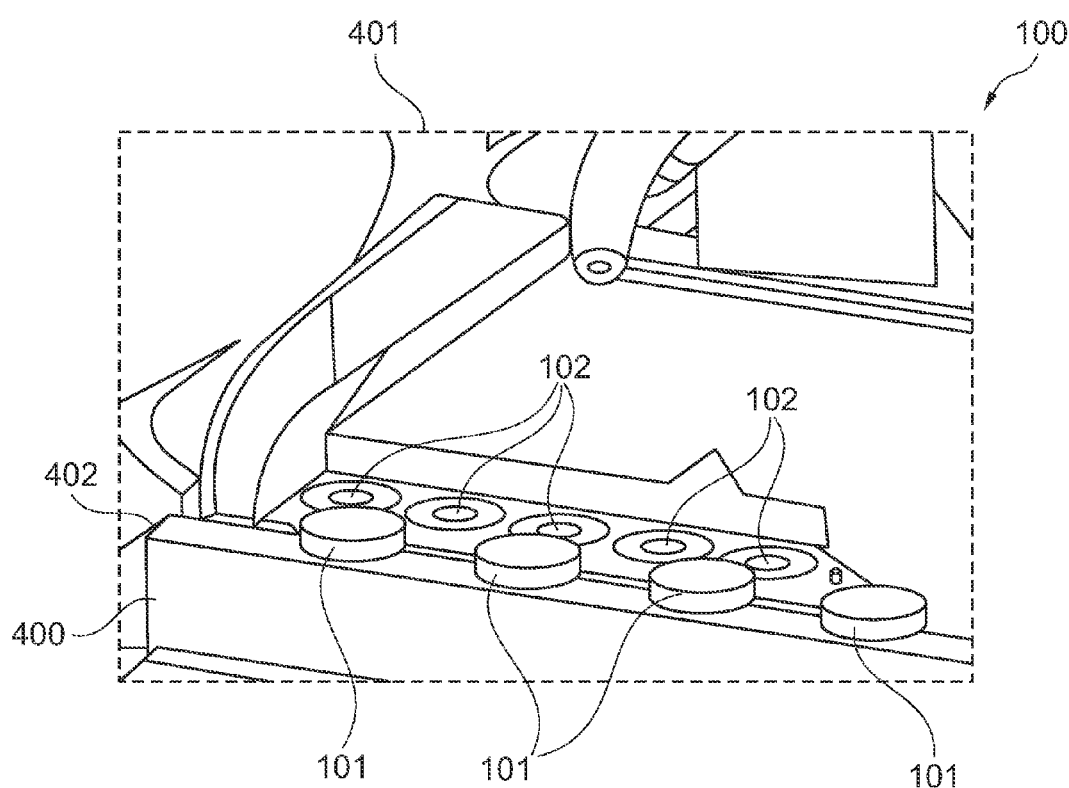
FIG. 4 shows a diagrammatic two-dimensional view of a floor in a vehicle with a system comprising hybrid transmitters according to an exemplary embodiment of the invention.

FIG. 4 shows a system 100 which in this exemplary embodiment comprises four hybrid transmitters as transmitter units 101 that are arranged underneath a seat rail 400 in the vehicle. An aircraft seat 401 arranged above comprises a multitude of corresponding receiver units 102. In-between, the floor 402 is arranged.

Figure 5:
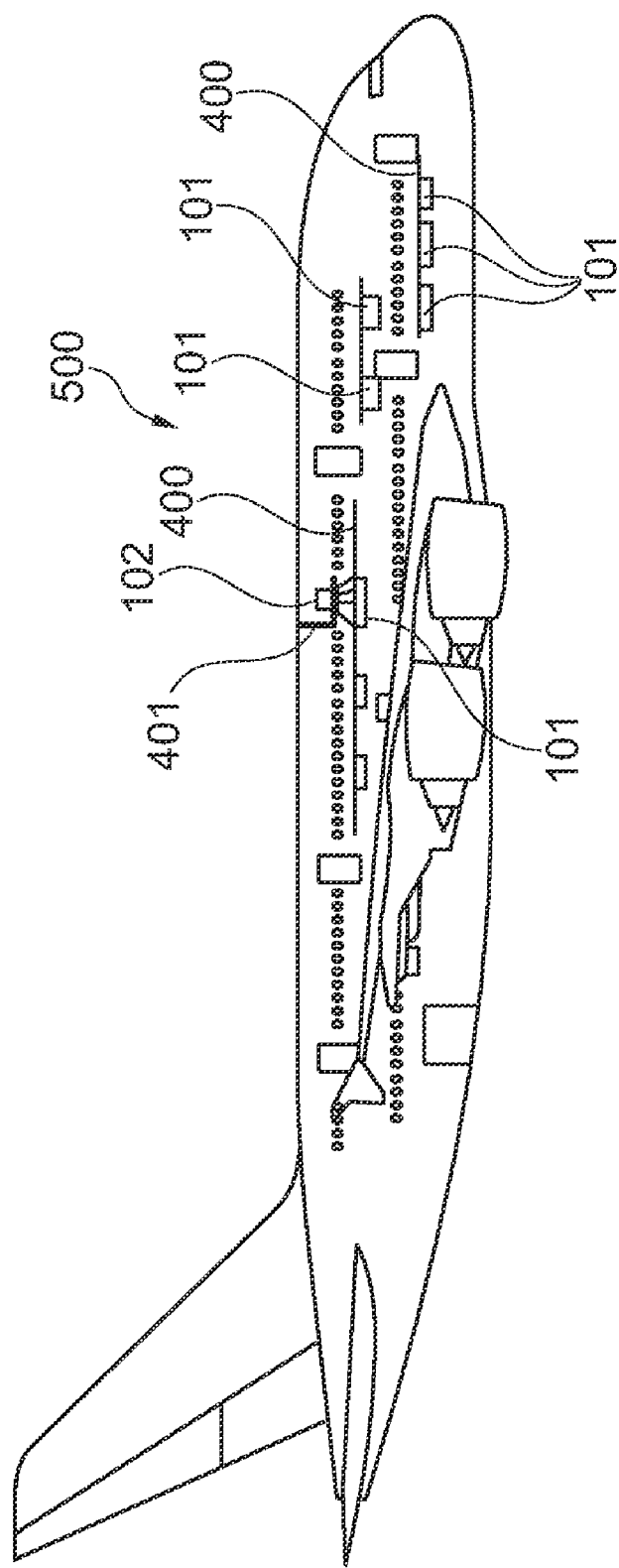
FIG. 5 shows an aircraft with a system comprising several hybrid transmitters according to an exemplary embodiment of the invention.

FIG. 5 shows an aircraft 500 in which a plurality of seat rails 400 with hybrid transmitters as transmitter units 101 and an aircraft seat 401 are arranged. In this arrangement the seat comprises a receiving unit 102.

Figure 6:
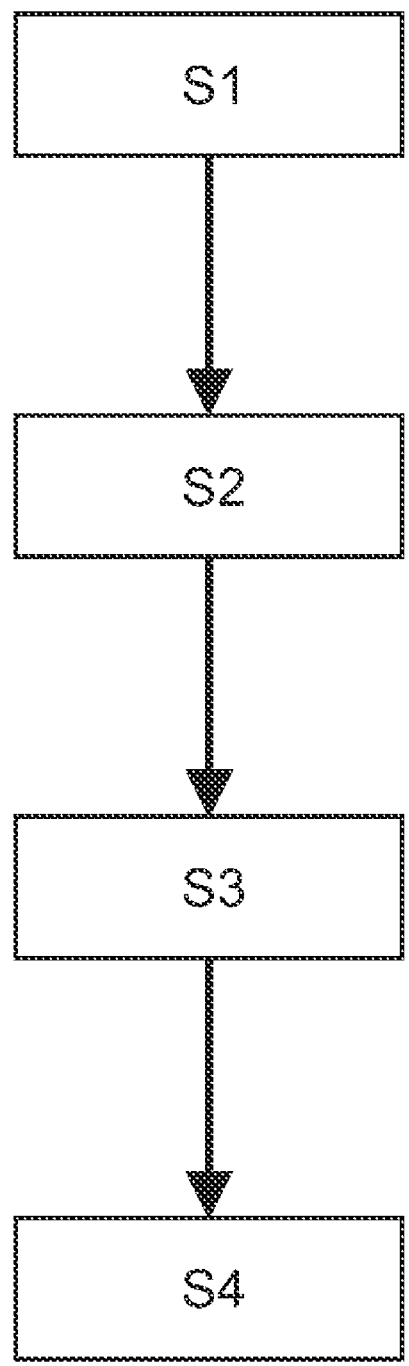
FIG. 6 shows a flow chart that illustrates a method according to an exemplary embodiment of the present invention.

FIG. 6 shows a flow chart to show a method for non-contacting energy and data transmission between two vehicle parts. The method comprises the two steps of: providing a first hybrid transmitter in the first vehicle part, S1; and providing a second hybrid transmitter in the second vehicle part, S2. The further step, namely non-contacting simultaneous transmission of energy and first data from the first vehicle part to the second vehicle part by means of a first transmitter device of the first hybrid transmitter to the second hybrid transmitter corresponds to step S3. The simultaneous step S4 comprises: parallel non-contacting transmission of second data from the first vehicle part to the second vehicle part by means of a second transmitter device of the first hybrid transmitter to the second hybrid transmitter.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments of the invention described above. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A system comprising two hybrid transmitters for non-contact energy and data transmission between a first vehicle part and a second vehicle part, the system comprising:
    a first hybrid transmitter as a transmitter unit;
    a second hybrid transmitter as a receiver unit;
    wherein the transmitter unit comprises a first transmitter device and a second transmitter device;

wherein the receiver unit comprises a first receiver device and a second receiver device;
wherein the first transmitter device is designed for non-contact transmission of energy and first data;
wherein the second transmitter device is designed for non-contact transmission of second data;
wherein the first receiver device is designed for non-contact reception of the energy and of the first data from the first transmitter device;
wherein the second receiver device is designed for non-contact reception of the second data from the second transmitter device;
wherein the first transmitter device further comprises:
a first control unit with a voltage input, a data input and a signal output,
wherein the first receiver device further comprises:
a second control unit with a signal input, a data output and a voltage output;
wherein the first control unit is equipped, from an electrical voltage that is present at the voltage input, to generate an alternating voltage at the signal output,
wherein the first control unit modulates the alternating voltage on a basis of the first data received at the data input; and
wherein the second control unit is designed, from the modulated alternating voltage that is present at the signal input, to demodulate the first data and to provide it at the data output, and to provide a voltage at the voltage output, which voltage has been prepared for use in an electrical consumer.

2. The system of claim 1,
wherein the first transmitter device comprises a primary coil and a primary core;
wherein the first receiver device comprises a secondary coil and a secondary core;
wherein the first transmitter device transmits the energy and the first data inductively by means of the primary coil and the primary core to the secondary coil and to the secondary core of the first receiver device.

3. The system of claim 2,
wherein from a point of view of construction the second transmitter device is integrated in the primary core of the first transmitter device.

4. The system of claim 2,
wherein from a point of view of construction the second transmitter device is integrated in the secondary core of the first receiver device.

5. The system of claim 2,
wherein at least one device of the second transmitter device and of the second receiver device is arranged in a region in which in a state in which current flows through the primary coil there is a minimum of a magnetic field.

6. The system of claim 2,
wherein at least part of the first transmitter device is encapsulated in a primary housing; and
wherein at least part of the first receiver device is encapsulated in a secondary housing.

7. The system of claim 6,
wherein the primary housing and the secondary housing each comprise an aperture;
wherein the second transmitter device is arranged in the aperture of the primary housing; and
wherein the second receiver device is arranged in the aperture of the secondary housing.

8. The system of claim 1, with the system further comprising:
a magnetic isolation;
wherein the magnetic isolation is placed in such a way that as a result of the magnetic isolation the second transmitter device and the second receiver device are protected from a magnetic field of the first transmitter device and of the first receiver device.

9. The system of claim 1, with the system further comprising:
the first vehicle part and the second vehicle part;
wherein the first vehicle part comprises the transmitter unit; and
wherein the second vehicle part comprises the receiver unit.

10. The system of claim 9,
wherein the first vehicle part is adapted to be arranged at a floor of a vehicle; and
wherein the floor of the vehicle is arranged between the transmitter unit and the receiver unit.

11. The system of claim 1,
wherein the second vehicle part is selected from the group comprising a seat; a passenger service unit (PSU); an in-flight entertainment system; a cargo container; a galley, or an on-board toilet.

12. The system of claim 1,
wherein the first vehicle part is adapted to be arranged so as to be affixed to a vehicle; and
wherein the second vehicle part can be positioned in different positions relative to the first vehicle part.

13. A seat rail for an aircraft for non-contact energy and data transmission between the seat rail and a seat, with the seat rail comprising:
a first hybrid transmitter as a transmitter unit;
a second hybrid transmitter as a receiving unit;
wherein the transmitter unit comprises a first transmitter device and a second transmitter device;
wherein the first transmitter device is designed for non-contact transmission of energy and first data, the first transmitter device including a first control unit with a voltage input, a data input and a signal output, and the first control unit is equipped, from an electrical voltage that is present at the voltage input, to generate an alternating voltage at the signal output and the first control unit modulates the alternating voltage on a basis of the first data received at the data input; and
wherein the receiving unit has a second control unit that is designed, from the modulated alternating voltage that is present at the signal input, to demodulate the first data and to provide it at the data output, and to provide a voltage at the voltage output, which voltage has been prepared for use in an electrical consumer.

14. An aircraft seat for non-contact energy and data transmission between the aircraft seat and a seat rail, with the aircraft seat comprising:
a hybrid transmitter as a receiver unit;
wherein the receiver unit comprises a first receiver device and a second receiver device;
wherein the first receiver device is designed for non-contact reception of the energy and of a first data from a first transmitter device;
wherein the second receiver device is designed for non-contact reception of the data from a second transmitter device;
wherein the first receiver device further comprises:
a control unit with a signal input, a data output and a voltage output; and
wherein the control unit is designed, from the modulated alternating voltage that is present at the signal input, to demodulate the first data and to provide it at the data output, and to provide a voltage at the voltage output, which voltage has been prepared for use in an electrical consumer.

15. An aircraft, comprising:
a first vehicle part;
a second vehicle part;
a system comprising two hybrid transmitters for non-contact energy and data transmission between the first vehicle part and the second vehicle part, the system comprising:
a first hybrid transmitter as a transmitter unit;
a second hybrid transmitter as a receiver unit;
wherein the transmitter unit comprises a first transmitter device and a second transmitter device;
wherein the receiver unit comprises a first receiver device and a second receiver device;
wherein the first transmitter device is designed for non-contact transmission of energy and first data;
wherein the second transmitter device is designed for non-contact transmission of second data;
wherein the first receiver device is designed for non-contact reception of the energy and of the first data from the first transmitter device;
wherein the second receiver device is designed for non-contact reception of the second data from the second transmitter device;
wherein the first transmitter device further comprises:
a first control unit with a voltage input, a data input and a signal output,
wherein the first receiver device further comprises:
a second control unit with a signal input, a data output and a voltage output;
wherein the first control unit is equipped, from an electrical voltage that is present at the voltage input, to generate an alternating voltage at the signal output,
wherein the first control unit modulates the alternating voltage on a basis of the first data received at the data input; and
wherein the second control unit is designed, from the modulated alternating voltage that is present at the signal input, to demodulate the first data and to provide it at the data output, and to provide a voltage at the voltage output, which voltage has been prepared for use in an electrical consumer.

16. A method for non-contact energy and data transmission between a first vehicle part and a second vehicle part, with the method comprising the following steps:
providing a first hybrid transmitter in the first vehicle part;
providing a second hybrid transmitter in the second vehicle part, the second hybrid transmitter acting as a receiver unit, the receiver unit including a control unit with a signal input, a data output and a voltage output;
non-contact simultaneous transmission of energy and first data from the first vehicle part to the second vehicle part by means of a first transmitter device of the first hybrid transmitter transmitting to the second hybrid transmitter, the first transmitter device including a first control unit with a voltage input, a data input and a signal output, the first transmitter device generating an alternative voltage at the signal output from an electrical voltage that is present at the voltage input and modulating the alternating voltage on a basis of the first data received at the data input;
parallel non-contacting transmission of second data from the first vehicle part to the second vehicle part by means of a second transmitter device of the first hybrid transmitter transmitting to the second hybrid transmitter;
demodulating the modulated alternating voltage present at the signal input with the control unit of the receiver unit to provide it at the data output and providing a voltage at the voltage output with the control unit of the receiver unit, which voltage has been prepared for use in an electrical consumer.

* * * * *